United States Patent
Kanematsu et al.

(10) Patent No.: US 10,837,663 B2
(45) Date of Patent: Nov. 17, 2020

(54) VENTILATION FAN HUMIDITY SENSOR AND CASE

(71) Applicant: Panasonic Intellectual Property Management Co., Ltd., Osaka (JP)

(72) Inventors: Daisuke Kanematsu, Aichi (JP); Yasuaki Shima, Aichi (JP); Shogo Maeda, Kagoshima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 15/846,335

(22) Filed: Dec. 19, 2017

(65) Prior Publication Data
US 2018/0180313 A1    Jun. 28, 2018

(30) Foreign Application Priority Data
Dec. 28, 2016    (JP) ................. 2016-254974

(51) Int. Cl.
*F24F 11/89* (2018.01)
*F24F 110/20* (2018.01)
*F24F 7/08* (2006.01)
*F24F 13/22* (2006.01)

(52) U.S. Cl.
CPC ............. *F24F 7/08* (2013.01); *F24F 11/89* (2018.01); *F24F 2013/221* (2013.01); *F24F 2110/20* (2018.01)

(58) Field of Classification Search
USPC .......................................... 454/354; 700/276
See application file for complete search history.

(56) References Cited

U.S. PATENT DOCUMENTS

| | | | | |
|---|---|---|---|---|
| 3,743,180 A | * | 7/1973 | Perkins | F24F 11/76 236/1 C |
| 4,795,090 A | * | 1/1989 | Koukal | B60H 1/00471 236/49.3 |
| 4,875,406 A | * | 10/1989 | Holter | B60H 3/0085 454/75 |
| 5,377,528 A | * | 1/1995 | Dauvergne | B60H 1/00792 165/11.1 |

(Continued)

FOREIGN PATENT DOCUMENTS

| JP | 2003-161480 A | 6/2003 |
|---|---|---|
| JP | 2005-300013 A | 10/2005 |
| JP | 2009-186042 A | 8/2009 |

*Primary Examiner* — Edelmira Bosques
*Assistant Examiner* — Frances F. Hamilton
(74) *Attorney, Agent, or Firm* — Pearne & Gordon LLP (57) ABSTRACT

A ventilation fan humidity sensor and case includes a ventilation fan and a housing in which a suction port and an exhaust port are provided, a blowing part that guides air to the exhaust port from the suction port, an orifice that guides air sucked from the suction port to the blowing part via an air exhaust channel that communicates the suction port and the exhaust port, a humidity sensor for detecting humidity of air in the housing, and a humidity sensor case for accommodating the humidity sensor. The humidity sensor case includes a sensor base with a box shape having an opening, a first sensor cap that has a first ventilation hole and covers the opening, and a second sensor cap that has a second ventilation hole and covers the opening inside the first sensor cap.

7 Claims, 6 Drawing Sheets

(56) References Cited

U.S. PATENT DOCUMENTS

| | | | | |
|---|---|---|---|---|
| 5,381,950 | A * | 1/1995 | Aldridge | G05D 23/1902 236/1 R |
| 5,880,353 | A * | 3/1999 | Graser | G01N 27/4077 422/94 |
| 5,881,951 | A * | 3/1999 | Carpenter | F24F 11/0008 236/44 A |
| 6,293,697 | B1 * | 9/2001 | Gul | H01H 37/04 174/547 |
| 6,347,746 | B1 * | 2/2002 | Dage | B60H 1/00785 236/44 C |
| 6,996,478 | B2 * | 2/2006 | Sunshine | B82Y 15/00 702/22 |
| 7,556,090 | B2 * | 7/2009 | Asai | B60H 1/00792 165/202 |
| 7,770,433 | B2 * | 8/2010 | Rothacher | B60H 1/00785 250/208.1 |
| 8,240,624 | B2 * | 8/2012 | Terasaki | G01D 11/245 248/230.8 |
| 9,022,846 | B1 * | 5/2015 | Tom | F24F 7/007 454/338 |
| 9,188,132 | B1 * | 11/2015 | Tom | F24F 7/007 |
| 10,041,818 | B2 * | 8/2018 | Graff | H04Q 9/00 |
| 10,634,404 | B2 * | 4/2020 | Obara | G01N 27/04 |
| 2002/0143232 | A1 * | 10/2002 | Richards | A61G 11/00 600/22 |
| 2003/0216837 | A1 * | 11/2003 | Reich | G05B 13/021 700/276 |
| 2008/0115519 | A1 * | 5/2008 | Vogh, III | F25D 21/04 62/247 |
| 2008/0258743 | A1 * | 10/2008 | Schmitt | B60H 1/00785 324/694 |
| 2009/0245324 | A1 * | 10/2009 | Sunaga | B60H 1/00792 374/142 |
| 2010/0243748 | A1 * | 9/2010 | Narikawa | F24F 3/1429 236/44 A |
| 2014/0008253 | A1 * | 1/2014 | Cantolino | G01D 11/245 206/305 |
| 2014/0184263 | A1 * | 7/2014 | Ehrenpfordt | G01D 11/245 324/762.03 |
| 2015/0224437 | A1 * | 8/2015 | Nygren | G01D 11/245 95/1 |
| 2016/0201935 | A1 * | 7/2016 | Jonas | G01N 19/10 236/44 A |
| 2017/0343395 | A1 * | 11/2017 | Woernle | G01D 11/245 |
| 2018/0052019 | A1 * | 2/2018 | Ghannam | H05K 5/0013 |
| 2018/0058713 | A1 * | 3/2018 | Spors | F24F 11/89 |
| 2018/0195750 | A1 * | 7/2018 | Wu | F24F 7/013 |
| 2018/0209929 | A1 * | 7/2018 | Yamazaki | B60H 1/00785 |
| 2018/0238571 | A1 * | 8/2018 | Joseph | F24F 11/0001 |
| 2019/0032951 | A1 * | 1/2019 | Yang | F24F 11/89 |

* cited by examiner

PRIOR ART

VENTILATION FAN HUMIDITY SENSOR AND CASE

BACKGROUND OF THE INVENTION

1. Technical Field

The present disclosure relates to a ventilation fan that is installed in a ceiling or the like of a building and ventilates indoor air by discharging the air.

2. Description of the Related Art

Conventionally, a ventilation fan that prevents water or dust from intruding into a rotary shaft of a motor has been known as shown in Unexamined Japanese Patent Publication No. 2005-300013.

Hereinafter, the ventilation fan will be described with reference to FIG. 7.

Figure 7:
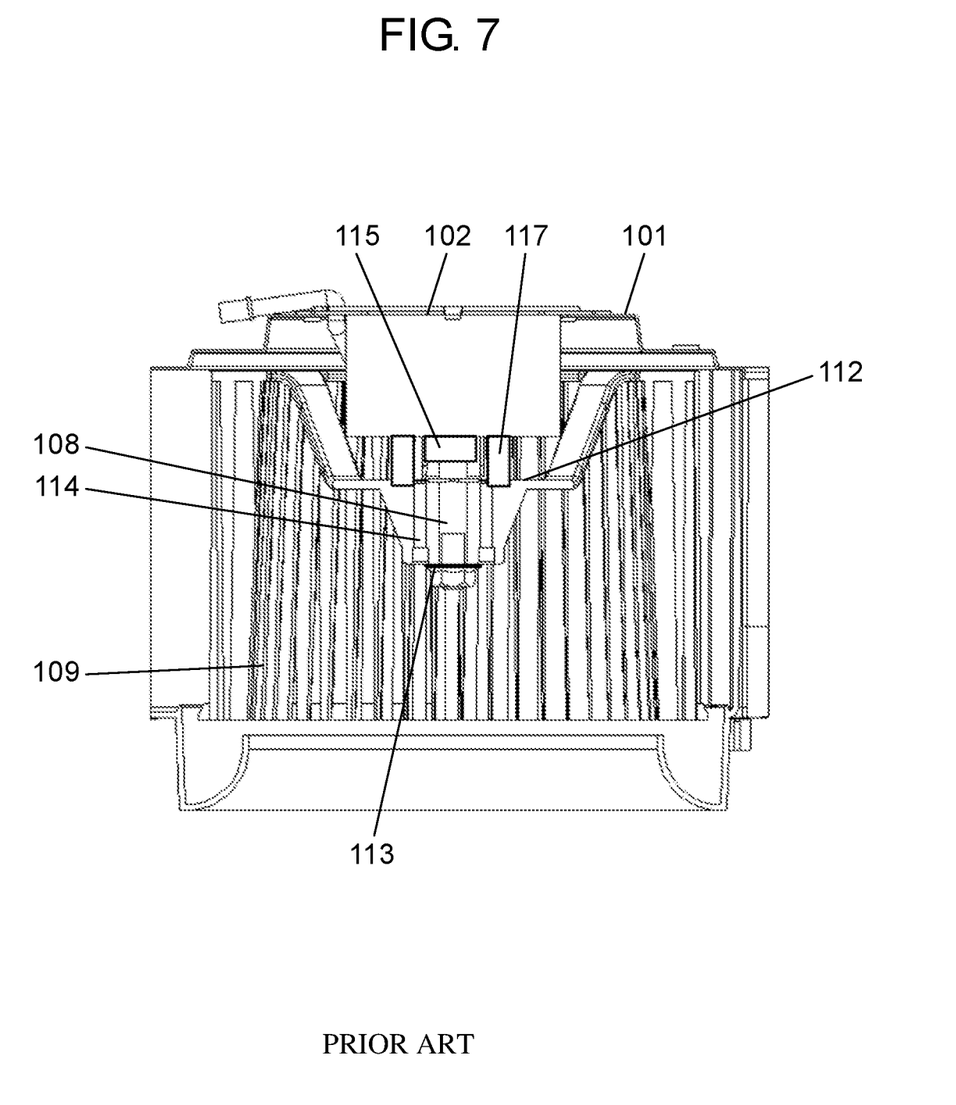
FIG. 7 is a front view schematically showing a structure of the conventional ventilation fan.

FIG. 7 is a front view schematically showing a structure of the conventional ventilation fan. As shown in FIG. 7, the conventional ventilation fan is configured to be installed in a ceiling of a building and have an opening provided in its lower surface. Further, fan 102 is incorporated in body box 101 whose one side surface is provided with an exhaust port. Fan 102 includes rotary shaft 108 formed in main plate 112 of impeller 109 and generates an airflow traveling from the opening in the lower surface to the exhaust port. Fan 102 is provided with boss part 113 into which rotary shaft 108 is to be inserted, and projected to the back of body box 101. Further, fan 102 is provided with rib 114 with a ring like shape whose inner diameter is larger than an outer diameter of bearing housing 115 of fan 102 for driving impeller 109. Bearing housing 115 is covered with rib 114. Further, in an outer circumferential portion of bearing housing 115, recess 117 with a ring like shape is formed. An end of rib 114 with a ring like shape is configured to be fitted to recess 117 rotatably.

SUMMARY OF THE INVENTION

In such a conventional ventilation fan, it is difficult to prevent water or dust from intruding into a humidity sensor or the like disadvantageously, although water or dust is prevented from intruding into a rotary shaft of a motor.

The present disclosure, which solves the above-mentioned conventional problem, aims to provide a ventilation fan capable of preventing water or dust from intruding into a humidity sensor or the like.

To achieve the above-mentioned aim, a ventilation fan in accordance with the present disclosure includes a housing in which an suction port and an exhaust port are provided, a blowing part that guides air to the exhaust port from the suction port, an orifice that guides air sucked from the suction port to the blowing part via an air exhaust channel that communicates the suction port and the exhaust port, a humidity sensor for detecting humidity of air within the housing, and a humidity sensor case for accommodating the humidity sensor. The humidity sensor case includes a sensor base with a box shape having an opening, a first sensor cap that has a first ventilation hole and covers the opening, and a second sensor cap that has a second ventilation hole and covers the opening inside the first sensor cap. Thus, the intended aim is achieved.

According to the present disclosure, a ventilation fan capable of preventing water or dust from intruding into a humidity sensor or the like can be provided.

DETAILED DESCRIPTION OF THE PREFERRED EMBODIMENT(S)

Hereinafter, with reference to the accompanying drawings, an exemplary embodiment of the present disclosure will be described to understand the present disclosure. Note that, the following exemplary embodiment is a mere example to specify the present disclosure, and therefore do not intend to limit the technical scope of the present disclosure. Further, through the entire drawings, substantially identical components are assigned the same reference signs, and overlapping description will be omitted. Furthermore, in each drawing, about details of each part not directly related to the present disclosure, the description thereof will be omitted.

First of all, a schematic structure of a ventilation fan in accordance with the present disclosure will be described with reference to FIGS. 1 and 2.

Figure 1:
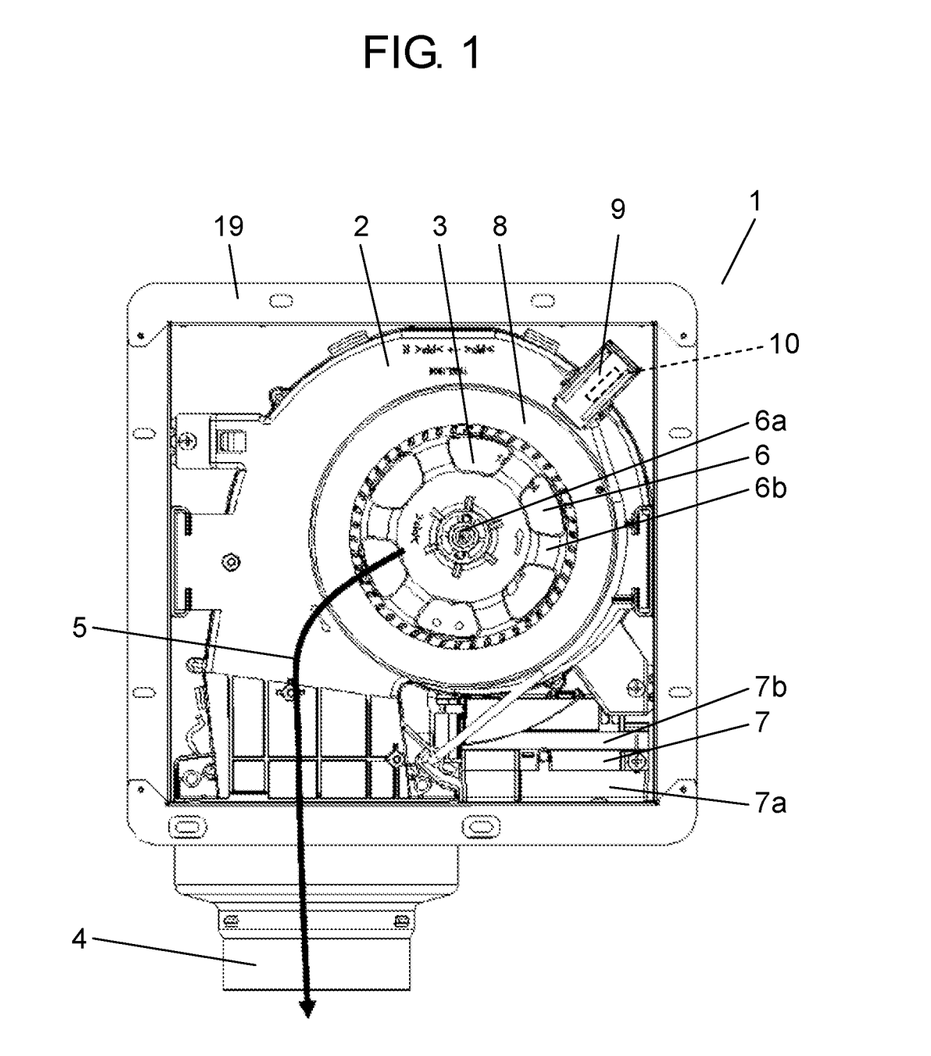
FIG. 1 is a plan view of a ventilation fan in accordance with the present disclosure when viewed from an indoor side.

FIG. 1 is a plan view of the ventilation fan in accordance with the present disclosure when viewed from an indoor side. FIG. 2 is a cross-sectional view of the ventilation fan in accordance with the present disclosure. Note that, design panel 14 is omitted in FIG. 1.

Figure 2:
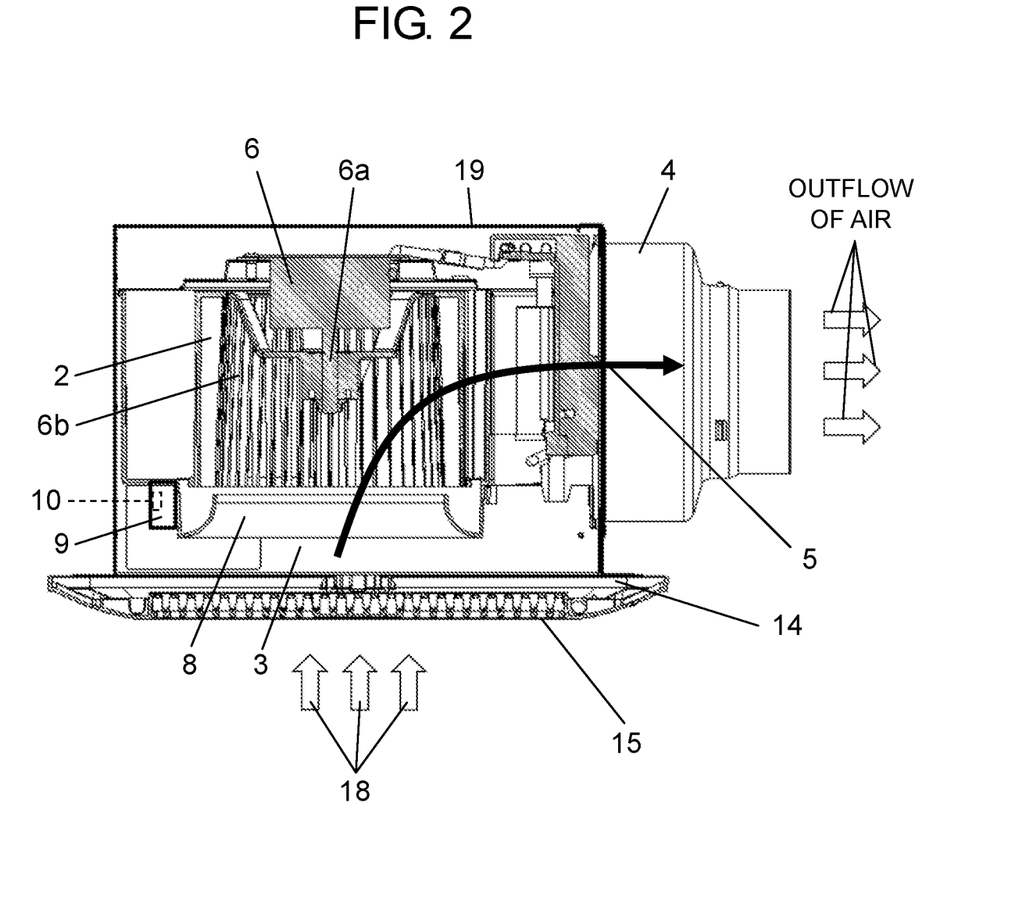
FIG. 2 is a cross-sectional view of the ventilation fan in accordance with the present disclosure.

Ventilation fan 1 in accordance with the present disclosure includes housing 19, blowing part 6, orifice 8, humidity sensor case 9, and humidity sensor 10 as shown in FIGS. 1 and 2.

Housing 19 has a box shape whose at least one surface is opened. Further, housing 19 is made of a metal or resin material. In the present exemplary embodiment, suction port 3 and exhaust port 4 are provided in housing 19.

Suction port 3 is proved in a surface directed vertically downward in the state where ventilation fan 1 is installed. For convenience, the surface in which suction port 3 is located is defined as a lower surface.

Exhaust port 4 is provided in any of side surfaces adjacent to the lower surface in which suction port 3 is provided.

Suction port 3 and exhaust port 4 are communicated inside housing 19, and the communicated air channel constitutes air exhaust channel 5.

Air exhaust channel 5 is defined as an air channel through which air travels from suction port 3 toward exhaust port 4 when ventilation fan 1 is operated.

Blowing part 6 includes casing 2, motor 6a, and fan 6b, and guides the air to exhaust port 4 from suction port 3.

Casing 2 forms an external structure of blowing part 6, and is made of a resin material. Casing 2 has a substantially cylindrical shape whose bottom, which is located in the lower surface, is provided with an opening for sucking air. Further, an opening for exhausting air is provided in a side surface of casing 2. Casing 2 is installed such that the opening provided in the bottom is brought close to suction port 3 and the opening provided in the side surface is connected to exhaust port 4. A side cross-section of casing 2 with a substantially cylindrical shape has a circular scroll shape.

Orifice 8 has a cylindrical shape whose center portion is provided with an opening. The opening provided in orifice 8 is connected to the opening provided in the bottom of casing 2. Orifices 8 is a component made of resin. Orifice 8 is located on an upstream side of blowing part 6 when viewed from an air flow direction, and fixed to casing 2 with a screw or the like. The air sucked from suction port 3 is guided to blowing part 6 by orifice 8 via air exhaust channel 5. Providing orifice 8 causes such an effect that the air sucked from suction port 3 is rectified and sucked into blowing part 6. Note that, orifice 8 may be integrated with casing 2.

Motor 6a is disposed on a top surface side in an inner space of casing 2, and held near a center portion of the circular scroll shape by using a screw or the like. Motor 6a includes a rotary shaft projected towards the bottom of casing 2. Motor 6a receives electric power to revolve the rotary shaft. The electric power is supplied to motor 6a via an electronic circuit board, which is not illustrated.

Fan 6b is, for example, a sirocco fan fixed to the rotary shaft. When electric power is supplied to motor 6a, the rotary shaft is revolved to rotate fan 6b. When fan 6b is rotated, air is moved. In other words, when blowing part 6 is driven, air is guided to exhaust port 4 from suction port 3.

The electronic circuit board is accommodated in electronic circuit board case 7 provided in housing 19, and fixed to near an external structure side of casing 2 with a screw or the like, which is not illustrated.

Electronic circuit board case 7 is constituted by electronic circuit board base 7a made of fire-retardant resin and electronic circuit board cover 7b similarly made of fire-retardant resin. The electronic circuit board is attached to electronic circuit board base 7a with a screw or the like. Further, electronic circuit board cover 7b is fixed to electronic circuit board base 7a with a screw or the like.

Humidity sensor case 9 is a rectangle-shaped box, and accommodates humidity sensor 10 in its inner space. Humidity sensor case 9 is attached to casing 2 on a side outer than an outer peripheral edge of orifice 8.

Humidity sensor 10 detects humidity in housing 19 and transmits, to the electronic circuit board, a voltage value for converting into a humidity value, for example. Accordingly, ventilation fan 1 can obtain surrounding humidity values.

Figure 3:
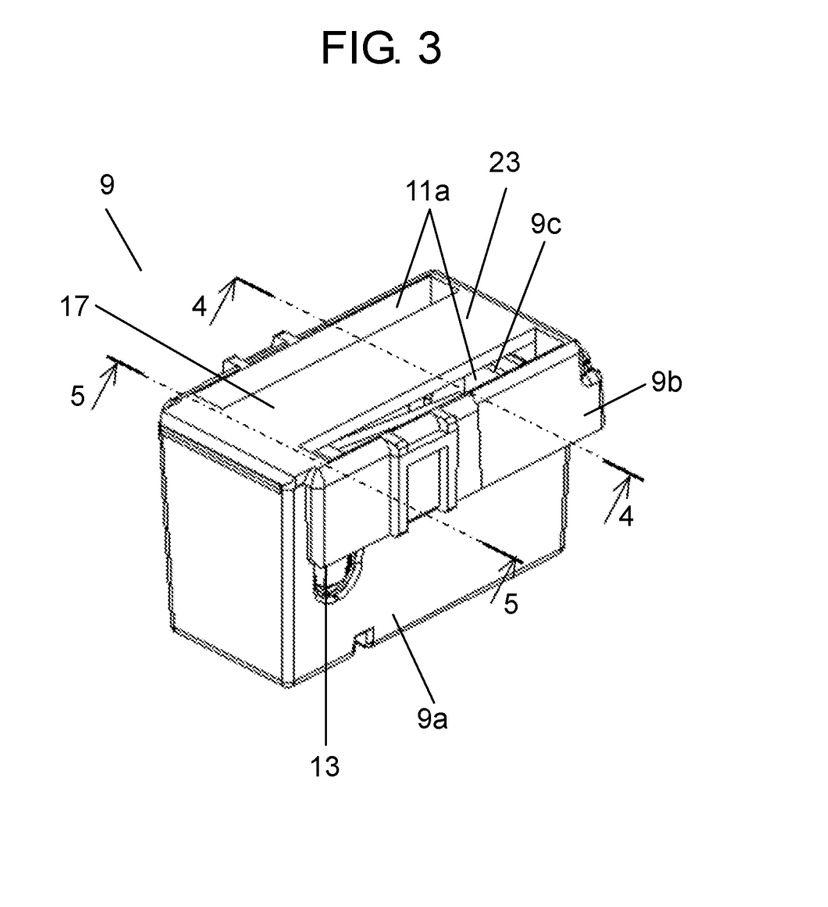
FIG. 3 is a perspective view of a humidity sensor case in accordance with the present disclosure.
Figure 4:
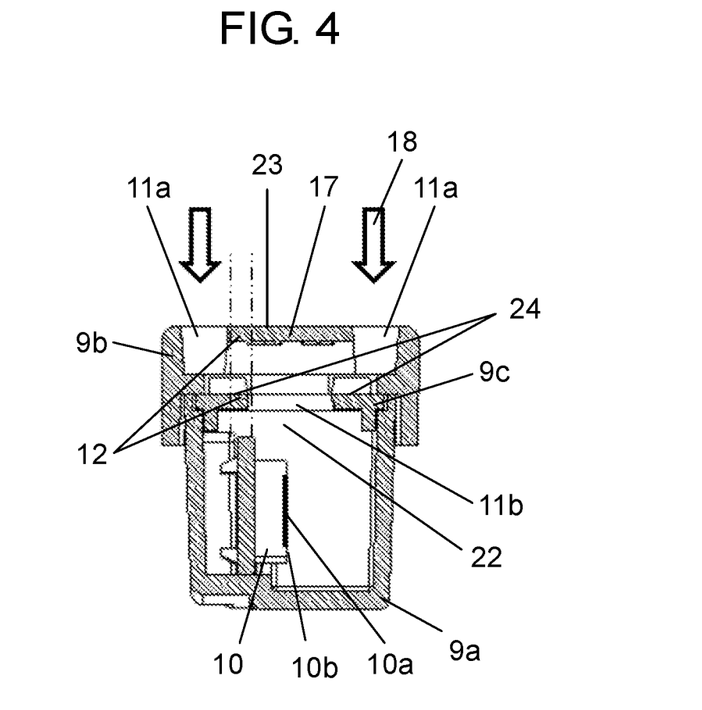
FIG. 4 is a cross-sectional view of the humidity sensor case taken along 4-4 line in FIG. 3.
Figure 5:
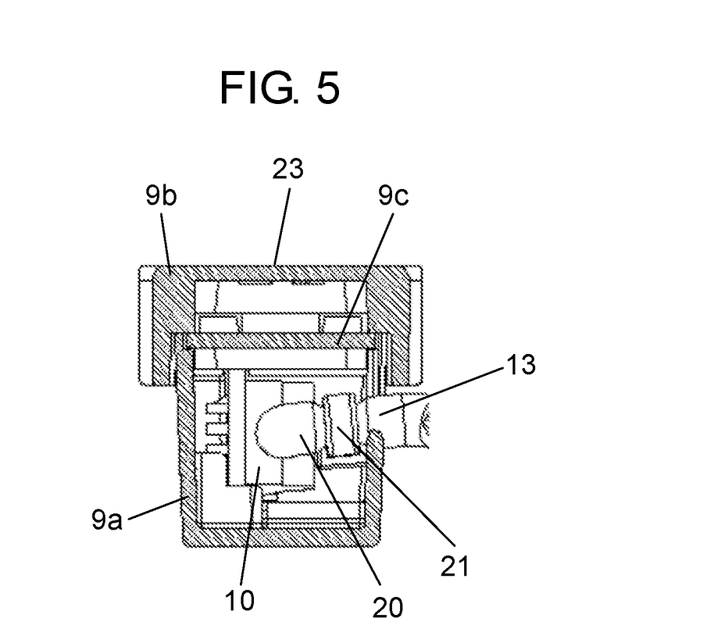
FIG. 5 is a cross-sectional view of the humidity sensor case taken along 5-5 line in FIG. 3.

Next, a detailed structure of humidity sensor case 9 will be described with reference to FIGS. 3, 4, and 5. Note that, FIG. 3 is a perspective view of a humidity sensor case in accordance with the present disclosure. FIG. 4 is a cross-sectional view of the humidity sensor case taken along 4-4 line in FIG. 3. FIG. 5 is a cross-sectional view of the humidity sensor case taken along 5-5 line in FIG. 3.

As shown in FIG. 3, humidity sensor case 9 includes sensor base 9a, first sensor cap 9b, and second sensor cap 9c.

As shown in FIG. 4, sensor base 9a has a box shape whose at least one surface is provided with opening 22. Further, sensor base 9a is made of a resin material. As shown in FIG. 5, one side surface of the box shape is provided with discharge port 13 through which the air that has flowed in via opening 22 is discharged. Note that, in the present exemplary embodiment, discharge port 13 is also used as an extraction port of control line 20.

Control line 20 is a lead wire employing an insulating coating such as cross-linked polyethylene or polyvinyl chloride. Humidity information, which is detected by humidity sensor 10, is transmitted to the electronic circuit board via control line 20.

First sensor cap 9b with a box shape has first ventilation holes 11a and first windbreak plate 17, and covers opening 22. In other words, first sensor cap 9b functions as a lid of sensor base 9a. Further, first sensor cap 9b is made of a resin material. In upper surface portion 23, which serves as a surface for covering opening 22 of sensor base 9a, of first sensor cap 9b, first ventilation holes 11a and first windbreak plate 17 are provided. Note that, in the present exemplary embodiment, the surface for covering opening 22 of sensor base 9a, i.e., upper surface portion 23 has a rectangular shape, but not limited to this. Any other shape capable of covering opening 22 may be employed.

Each of first ventilation holes 11a is a rectangular opening that extends from one side in a transverse direction of upper surface portion 23 to the other side of upper surface portion 23 opposite to the one side. First ventilation holes 11a each are provided near and in parallel to a corresponding one of sides in a longitudinal direction of upper surface portion 23. Note that, in the present exemplary embodiment, two first ventilation holes 11a are provided in upper surface portion 23, but not limited to this.

First windbreak plate 17 has a rectangular plate shape that extends from one side to the other side opposite to the one side, and is provided to be interposed between two first ventilation holes 11a.

Second sensor cap 9c, which has a rectangular plate shape, has second ventilation hole 11b and second windbreak plates 24, and covers opening 22 inside first sensor cap 9b. In other words, second sensor cap 9c functions as a lid of sensor base 9a inside first sensor cap 9b. In a face, which covers opening 22 of sensor base 9a, of the second sensor cap 9c, second ventilation hole 11b and second windbreak plates 24 are provided.

Second ventilation hole lib is a rectangular opening that extends from one side in a transverse direction of second sensor cap 9c to the other side of second sensor cap 9c opposite to the one side. Second ventilation hole lib is in parallel to two sides in a longitudinal direction of second sensor cap 9c, and provided at a position equidistantly spaced from the two sides in the longitudinal direction.

Each of second windbreak plates 24 is a rectangular plate that extends from one side in the transverse direction of second sensor cap 9c to the other side of second sensor cap 9c opposite to the one side. Each of second windbreak plates 24 indicates the vicinity of a corresponding one of two side edges in the longitudinal direction that form second ventilation hole lib in second sensor cap 9c.

In the cross sectional view shown in FIG. 4, first ventilation holes 11a and second ventilation hole 11b are do not overlap each other when viewed from inflow direction 18 of the air.

Further, first windbreak plate 17 and second windbreak plates 24 include overlapping parts 12 in the cross sectional view shown in FIG. 4, each being configured such that first windbreak plate 17 and each of second windbreak plates 24 include overlapping parts 12 each other when viewed from inflow direction 18 of the air.

Overlapping parts 12 each correspond to the vicinity of a corresponding one of two side (both side) edges in a longitudinal direction of first windbreak plate 17 and the vicinity of a corresponding one of two side edges in a longitudinal direction of second windbreak plates 24.

Humidity sensor case 9 accommodates humidity sensor 10, mentioned above, thereinside.

Humidity sensor 10 has a plate shape whose main surface 10*b* is provided with sensor core 10*a* for detecting humidity. In other words, sensor core 10*a* is provided in main surface 10*b* as a measuring surface. Humidity sensor 10 is accommodated in the humidity sensor case such that main surface 10*b* is in direct contact with the air. In the present exemplary embodiment, as shown in FIG. 4, humidity sensor 10 is disposed such that main surface 10*b* is in parallel to inflow direction 18 of the air. Therefore, humidity sensor 10 and sensor core 10*a* do not interrupt a flow of the air. According to the structure, the air that has flowed into humidity sensor case 9 is discharged from discharge port 13, without staying in humidity sensor case 9. Thus, only the air that has flowed into humidity sensor case 9 can easily come into direct contact with sensor core 10*a*. This makes it possible for sensor core 10*a* to follow change in humidity within ventilation fan 1 quickly, and measure a humidity value correctly. Further, air constantly flows into humidity sensor case 9 during operation of ventilation fan 1. This makes it possible to prevent dew condensation on sensor core 10*a*.

The detailed structure of humidity sensor case 9 has been described in the above.

Figure 6:
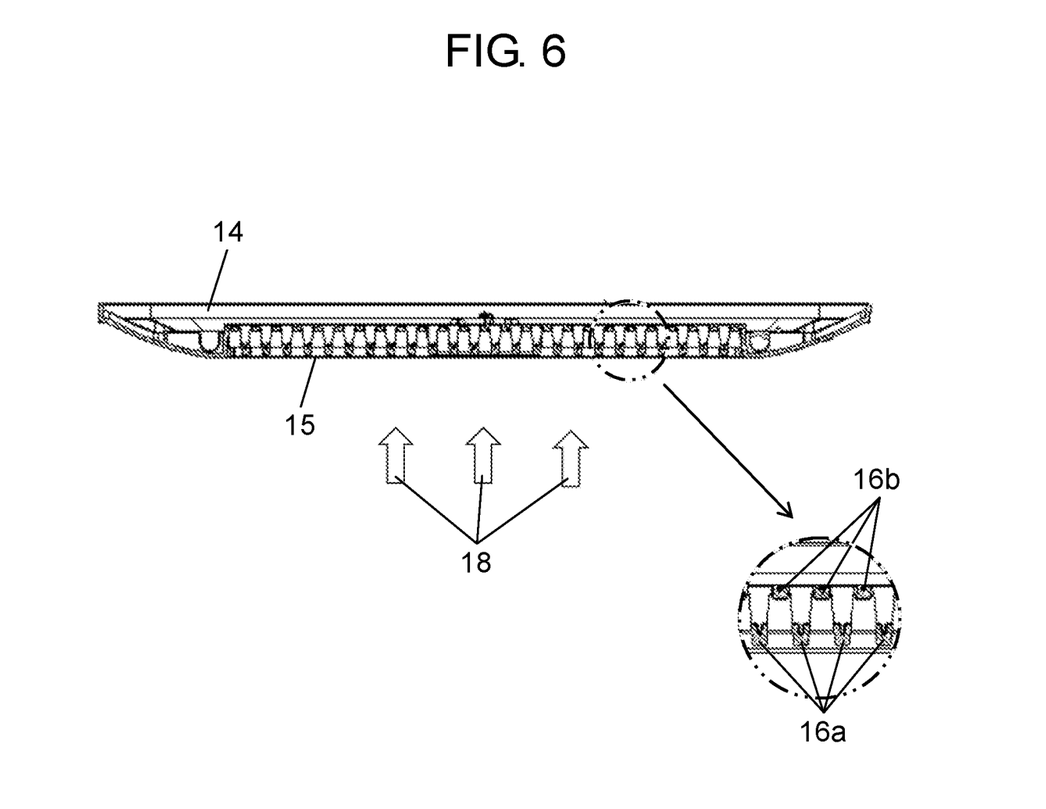
FIG. 6 is a cross-sectional view showing a positional relationship between an upstream side crosspiece and a downstream side crosspiece of a design panel in accordance with the present disclosure.

Subsequently, detailed structures of ventilation fan 1 and design panel 14 will be described with reference to FIGS. 2 and 6. Note that, FIG. 6 is a cross-sectional view showing a positional relationship between an upstream side crosspiece and a downstream side crosspiece of the design panel in accordance with the present disclosure.

In the case where a user uses ventilation fan 1, design panel 14 having a design surface, which is aesthetically designed, is typically attached so as to cover suction port 3 of housing 19. Design panel 14 is disposed at a position where the design surface is exposed to a user's eyes. In other words, an opposite surface of design panel 14 from the design surface is located on a suction port 3 side of housing 19.

Design panel 14 has an annular rectangle shape whose center portion is provided with suction opening 15 for sucking air. Note that, the annular rectangle shape, described herein, is a shape of which an outer periphery has a rectangular shape and an inner periphery has an opened center portion.

Further, design panel 14 includes a double lattice structure.

The double lattice structure has such a structure that, in a cross sectional view of design panel 14 shown in FIG. 6, upstream side crosspieces 16*a*, which are disposed on an upstream side of suction opening 15 in inflow direction 18 of the air, and downstream side crosspieces 16*b*, which are disposed on a downstream side of suction opening 15, are alternately arranged.

Subsequently, a flow of air and an operation of each part will be described with reference to FIG. 2, when a user uses ventilation fan 1.

When ventilation fan 1 is operated, air is guided to suction opening 15 of design panel 14 from an indoor room and sucked into blowing part 6, while being rectified by orifice 8 that is attached to the opening provided in the bottom of casing 2. The sucked air is accelerated and pressurized by blowing part 6, and pushed out toward exhaust port 4 from air exhaust channel 5.

At this time, to revolve the rotary shaft of motor 6*a*, electric power is supplied to motor 6*a* via the electronic circuit board. A power line for connecting the electronic circuit board and motor 6*a* electrically, and control line 20 for connecting the electronic circuit board and humidity sensor 10 shown in FIG. 5 electrically are connected via an opening provided in a part of electronic circuit board base 7*a* and electronic circuit board cover 7*b* which constitute electronic circuit board case 7 shown in FIG. 1. Electronic circuit board case 7 is fixed to an end of casing 2 with a screw or the like. In casing 2, a flow of air does not occur.

In other words, since the entire periphery of the electronic circuit board is protected by electronic circuit board base 7*a* and electronic circuit board cover 7*b*, the electronic circuit board is less susceptible to adverse effects such as failure caused by intrusion of water drops or dust.

Further, orifice 8 has the effect of rectifying the air that is sucked into blowing part 6 from suction port 3. Besides, humidity sensor case 9 is disposed on a peripheral side of orifice 8. According to the structure, since water drops and dust adhering to orifice 8 are pulled in a direction that goes from suction port 3 to blowing part 6 when ventilation fan 1 is operated, the water drops and dust are difficult to scatter toward the peripheral side of orifice 8. This makes it possible to prevent intrusion into humidity sensor case 9, which is caused by scattering water drops or dust adhering to the vicinity of orifice 8. In other words, water drops and dust adhering to the vicinity of orifice 8 are difficult to scatter into humidity sensor case 9 disposed on the peripheral side of orifice 8. Therefore, humidity sensor case 9 is less susceptible to adverse effects such as failure caused by intrusion of water drops and dust. Note that, herein, although the influence of water drops and dust adhering to orifice 8 has been described, even water drops and dust adhering to the inside of design panel 14 (see FIG. 2) or housing 19 (see FIG. 2) may also have the same effect.

Further, within housing 19, humidity sensor 10 is accommodated in humidity sensor case 9, and humidity sensor case 9 is attached to casing 2 on a side outer than an outer peripheral edge of orifice 8. Furthermore, humidity sensor 10 shown in FIG. 4 is protected by the double lid constituted by first sensor cap 9*b* and second sensor cap 9*c*, and therefore is less susceptible to adverse effects such as failure caused by intrusion of water drops and dust.

Further, humidity sensor case 9 includes overlapping part 12. The presence of overlapping part 12 makes it possible to prevent water drops from intruding into humidity sensor case 9, even if humidity sensor case 9 is exposed to water drops splashed from a lower surface when installed.

Further, discharge port 13 is provided in one side surface of sensor base 9*a* shown in FIG. 5. Thus, air is prevented from staying in humidity sensor case 9, thereby making it possible to detect humidity with high accuracy.

Discharge port 13 is also used as an extraction port of control line 20, and is provided in the side surface of sensor base 9*a*, especially on a side facing a detection surface of sensor core 10*a* (see FIG. 4) of humidity sensor 10. Thus, the air that has flowed into humidity sensor case 9 is discharged from discharge port 13, without a flow of the air being interrupted by humidity sensor 10 and sensor core 10*a*. Therefore, humidity sensor 10 can detect humidity with high accuracy.

Further, band 21, which is made of resin, is wound around control line 20 such that control line 20 has a diameter larger than that of discharge port 13. Thus, the band of a plurality of lines constituting control line 20 can be prevented from being broken. Furthermore, when control line 20 is pulled from the outside, band 21 is caught in discharge port 13. Therefore, external force is prevented from being applied to humidity sensor 10 directly.

Further, since band 21 plays the role of a wall, dew condensation water or the like can be prevented from intruding into humidity sensor case 9 from discharge port 13. This expects that dew condensation water or the like is prevented from reaching humidity sensor 10.

Further, as shown in FIG. 6, design panel 14 includes a double lattice structure in a design surface in which suction opening 15 for sucking air is provided. This prevents water from reaching humidity sensor 10, even if water of a shower is splashed from an indoor room at the time of cleaning, for example. In other words, the double lid structure protects humidity sensor case 9 from water drops, even if humidity sensor case 9 is exposed to water drops splashed from a lower surface when installed, and can prevent faults such as failure.

The ventilation fan in accordance with the present disclosure is usable for ventilation equipment installed not only in a ceiling of a building but in a wall surface or the like.

What is claimed is:

1. A ventilation fan humidity sensor and case comprising:
   a ventilation fan,
   a ventilation fan housing in which a suction port and an exhaust port are provided;
   a blowing part that guides air to the exhaust port from the suction port;
   an orifice that guides air sucked from the suction port to the blowing part via an air exhaust channel that fluidly connects the suction port and the exhaust port;
   a humidity sensor for detecting humidity of air in the housing; and
   a humidity sensor case for accommodating the humidity sensor,
   wherein
   the humidity sensor case includes:
     a base with a box shaped housing having an opening, a bottom surface opposite to the opening, and at least one side surface extending from the bottom surface;
     a first cap that has a first ventilation hole and that partially covers the opening; and
     a second cap that has a second ventilation hole and that partially covers the opening, the second cap being inside the base,
   wherein a discharge port is provided in one of the at least one side surfaces and
   air that has entered through the first ventilation hole and the second ventilation hole flows out of the humidity sensor case through the discharge port.

2. The ventilation fan humidity sensor and case according to claim 1, wherein
   the first ventilation hole and the second ventilation hole do not align when viewed from an inflow direction of air.

3. The ventilation fan humidity sensor and case according to claim 1, wherein
   the first cap includes a first windbreak plate that prevents inflow of air, and
   the second cap includes a second windbreak plate that prevents inflow of air,
   wherein
     the first windbreak plate and the second windbreak plate include overlapping parts when viewed from an inflow direction of the air.

4. The ventilation fan humidity sensor and case according to claim 1, comprising
   a design panel that covers the suction port and has a design surface in which a suction opening for sucking air is provided,
   wherein
   the design panel includes a double lattice structure.

5. The ventilation fan humidity sensor and case according to claim 4, wherein
   the double lattice structure comprises:
   an upstream side crosspiece located on an upstream side in the suction opening; and
   a downstream side crosspiece located on a downstream side of the upstream side crosspiece in the suction opening.

6. The ventilation fan humidity sensor and case according to claim 1, wherein
   the humidity sensor has a detection surface provided with a sensor core for detecting humidity, and the side surface facing the detection surface of the humidity sensor.

7. The ventilation fan humidity sensor and case according to claim 1, wherein
   the humidity sensor case is provided in the housing and outside of a peripheral edge of the orifice.

* * * * *